(12) United States Patent
Engelbrecht

(10) Patent No.: US 6,550,566 B1
(45) Date of Patent: Apr. 22, 2003

(54) PHASE MAINTAINING CONTROL FOR A HYDRAULIC STEERING SYSTEM

(75) Inventor: Joshua J. Engelbrecht, Ankeny, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/978,977

(22) Filed: Oct. 17, 2001

(51) Int. Cl.⁷ .................................................. B62D 5/06
(52) U.S. Cl. ........................ 180/432; 180/442; 91/461
(58) Field of Search ............................... 180/432, 442, 180/403, 417; 91/461; 137/625.6, 625.61; 60/384, 387, 392

(56) References Cited

U.S. PATENT DOCUMENTS

| | | | | |
|---|---|---|---|---|
| 3,856,047 A | * | 12/1974 | Takayama | 137/625.61 |
| 4,136,753 A | * | 1/1979 | Merkel | 180/133 |
| 4,313,468 A | * | 2/1982 | Patel | 137/625.61 |
| 5,203,149 A | * | 4/1993 | Youngberg et al. | 56/14.9 |
| 5,320,191 A | * | 6/1994 | Sudo et al. | 180/132 |
| 5,497,692 A | * | 3/1996 | Marcott | 91/523 |
| 5,520,262 A | * | 5/1996 | Marcott | 180/418 |
| 5,597,172 A | | 1/1997 | Maiwald et al. | 280/672 |
| 5,904,365 A | * | 5/1999 | Dillon | 280/419 |
| 5,934,406 A | * | 8/1999 | Dvorak et al. | 180/442 |
| 5,937,966 A | * | 8/1999 | Li | 180/432 |
| 6,131,687 A | * | 10/2000 | Leidinger et al. | 180/403 |
| 6,179,082 B1 | * | 1/2001 | Ikari | 180/418 |
| 6,196,249 B1 | * | 3/2001 | Kemmner et al. | 137/82 |
| 6,286,535 B1 | * | 9/2001 | Harms et al. | 137/14 |

* cited by examiner

Primary Examiner—Lesley D. Morris
Assistant Examiner—Tony Winner

(57) ABSTRACT

A dual counterbalance valve is added in the hydraulic lines between the steering unit and the steering cylinders on an implement to maintain pressure in the steering lines by metering hydraulic fluid to and from the cylinders under pressure so that the steered wheels stay in phase. Since the steering system is kept under constant pressure, the wheels can only be steered by the steering unit and not by tractive soil forces so toe in and toe out problems are eliminated without need for a mechanical tie rod connecting the steered wheels. The valve is added in-line to the system so that current machines can be easily retrofitted.

12 Claims, 3 Drawing Sheets

PHASE MAINTAINING CONTROL FOR A HYDRAULIC STEERING SYSTEM

FIELD OF THE INVENTION

The present invention relates generally to hydraulic steering systems and, more specifically, to a system for hydraulically maintaining steered wheels in phase without need for a mechanical tie rod.

BACKGROUND OF THE INVENTION

To maintain phase of the steered wheels of implements such as self-propelled sprayers, the wheels often are tied together hydraulically rather than mechanically so that expensive and cumbersome tie rods are eliminated. Although the wheels are normally maintained in proper phase, very high pressure loads which develop under certain conditions such as operation in soft soils or on side hills can cause the steering unit to leak so that pressure in the steering lines is lost and steering phase is lost. The steering unit components are typically manufactured with loose tolerances to prevent contaminants in the hydraulic system from prematurely wearing seals and liners. Such tolerances, however, increase the problem of leakage and steering phase loss.

An example of lost steering phase is shown in the schematic representation of a prior art sprayer 10 in FIG. 1 having steerable wheels 12. The wheels 12 can toe in or toe out to disrupt proper steering function and put high loads on the suspension system and on the drivetrain. Similar problems can develop on rear wheels 14 if the sprayer 10 has four wheel steering.

Attempts to correct steering phase problems under high loads have included utilization of pilot operated check valves in the hydraulic steering system to hold steering pressure. However, the check valves introduce excessive chatter into the system and have not provided an acceptable solution to the problems. Circuits with check valves and no relief paths can generate damaging high pressures when obstacles are struck or when certain maneuvers are performed.

SUMMARY OF THE INVENTION

It is therefore an object of the invention to provide an improved hydraulic steering system for a vehicle such as an agricultural sprayer which overcomes the aforementioned problems.

It is another object of the invention to provide an improved hydraulic steering system for an off-road vehicle which maintains steered wheel phase, even when the wheels are subjected to high force loads, so that need for mechanical tie rods is eliminated. It is another object to provide such a system which maintains pressure in the steering lines under severe operating conditions so that wheel phase is not lost when a hydraulic tie rod system is utilized.

It is yet another object of the invention to provide an improved hydraulic steering system for an implement such as a sprayer having a counterbalance valve between the steering unit and the steering cylinders which maintains pressure in the steering lines to retain proper phase of the steered wheels even under severe wheel load conditions such as encountered when the implement is operating in soft soils or on side hills. It is still another object to provide such a system wherein damaging high pressures are avoided when obstacles are struck or when high force maneuvers are performed.

It is still a further object of the invention to provide an improved hydraulic steering system for an implement having a valve that can be easily added to new systems or retrofitted on old systems, wherein the valve maintains wheel steer synchronization without need for mechanical linkages.

In accordance with the above objectives, a dual counterbalance valve is added in the hydraulic lines between the steering unit and the steering cylinders on an implement. The counterbalance valve maintains pressure in the steering lines by metering hydraulic fluid to and from the cylinders under pressure so that the steered wheels stay in phase. Since the steering system is constantly kept under pressure, the wheels can only be steered by the steering unit and not by tractive soil forces. Therefore, toe in and toe out problems are eliminated without need for a mechanical tie rod connecting the steered wheels. The valve conveniently is added in-line to the steering cylinders so that current machines can be easily retrofitted.

DESCRIPTION OF THE PREFERRED EMBODIMENT

Figure 1:
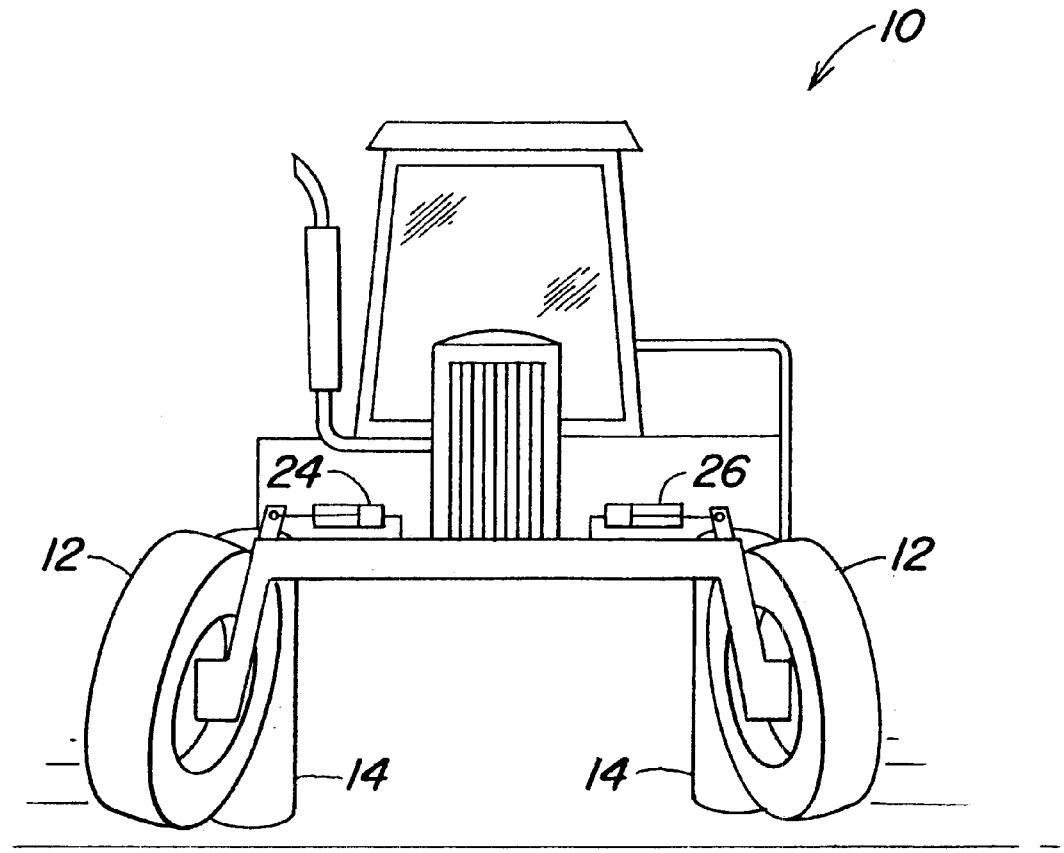
FIG. 1 is a schematic representation of a sprayer with a prior art hydraulic steering system showing the problem of hydraulically steered wheels moved out of phase by excessive forces on the wheels.

Referring now to FIG. 1, therein is shown the sprayer or other off-road vehicle 10 of the prior art having hydraulically steered front wheels 12 and fixed rear wheels 14. Alternatively, the rear wheels may also be steered.

Figure 2:
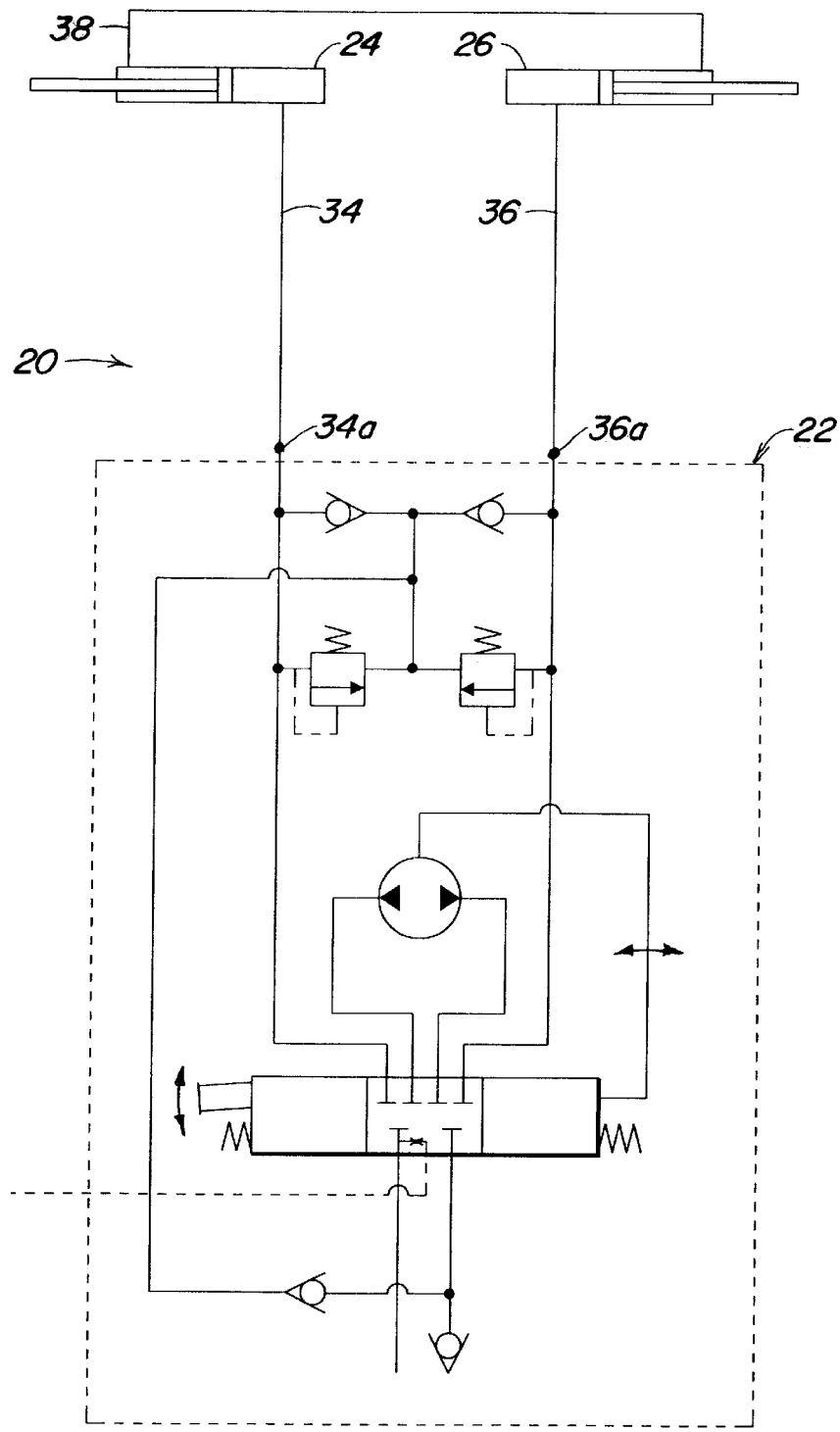
FIG. 2 is a schematic of the hydraulic system utilized with the sprayer of FIG. 1.

FIG. 2 shows a schematic of the hydraulic steering system 20 for the sprayer of FIG. 1. The system includes a conventional steering unit 22 connected to steering cylinders 24 and 26 by first and second steering lines 34 and 36 which, in turn, are connected to the outlet ports 34a and 36a of the steering unit 22. When the steering wheel is turned, the rotary input moves a spool and turns a gerotor. The spool connects the pressure port to the proper steering line 34 or 36 depending on which way the steering wheel is turned. The gerotor meters the pressurized hydraulic fluid to the cylinders 24 and 26 depending on how the steering wheel is turned.

As shown, the line 34 is connected to the base end of the steering cylinder 24, and the rod end of the cylinder 24 is connected to the rod end of the cylinder 26 by a line 38. The base end of the cylinder 26 is connected to the line 36. As the steering wheel is turned a first direction, pressurized hydraulic fluid is communicated to the base end of the cylinder 24 to extend its rod and retract the rod of the cylinder 26 to turn the wheels 12 in the first direction. Hydraulic fluid from the base end of the cylinder 26 is returned to the steering unit via line 36 as the cylinder 24 extends and the cylinder 26 retracts. Turning the steering wheel the opposite direction pressurizes the line 36 to cause the cylinder 26 to extend and the cylinder 24 to retract to turn the wheels 12 in the second direction. Under certain extreme operating conditions, high forces developed in the cylinders can cause leakage in the steering unit 22 so that pressure in the steering line 38 is lost and steering phase is lost, a problem illustrated in FIG. 1.

Figure 3:
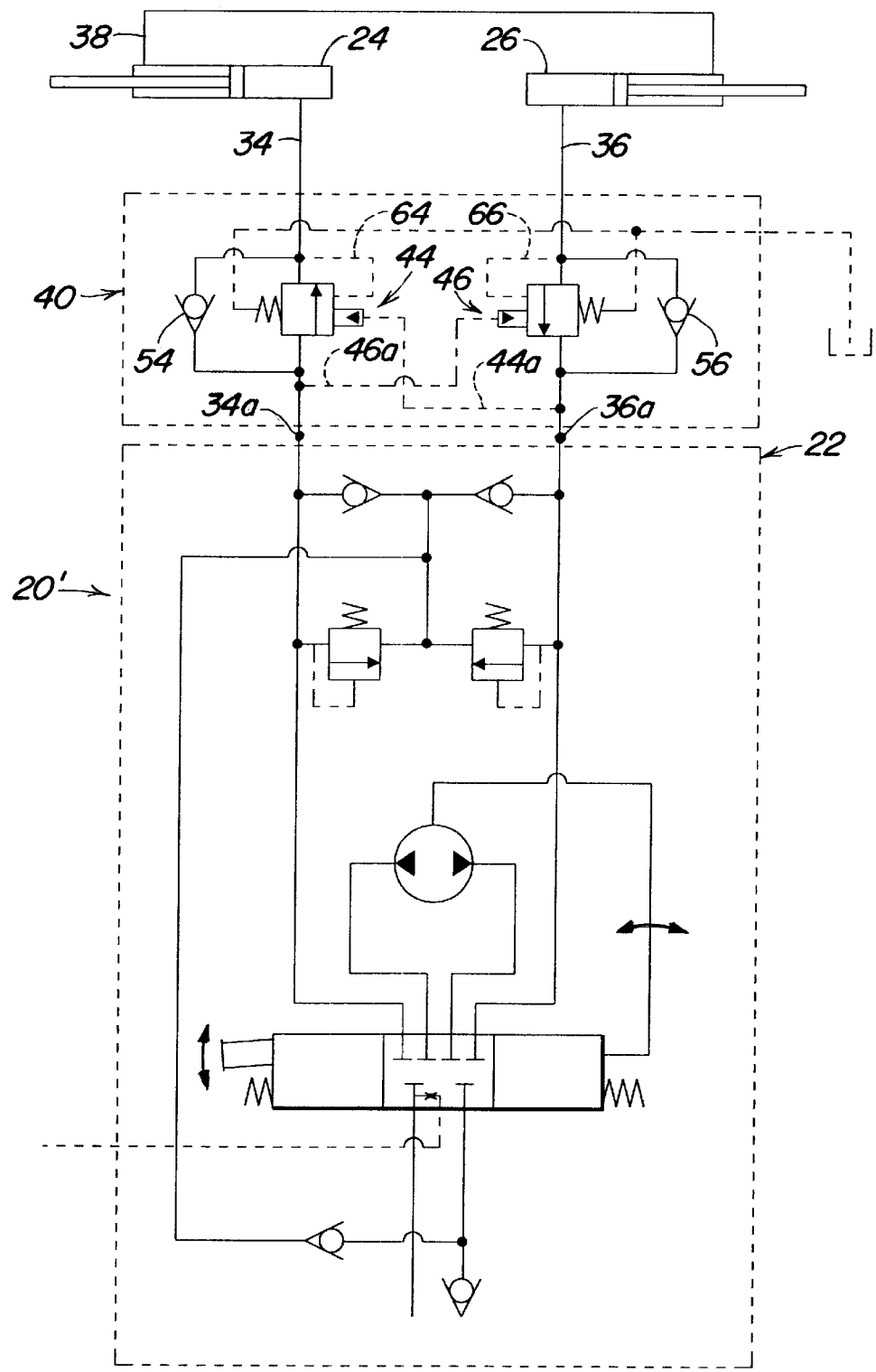
FIG. 3 is a hydraulic system schematic similar to that of FIG. 2 but including a counterbalance valve to overcome the phase problem shown in FIG. 1.

FIG. 3 shows the improved steering system 20' which also has a steering unit 22 and steering cylinders 24 and 26 generally identical to those shown in FIG. 2. However, unlike the conventional system 20, a dual counterbalance valve 40 is added to the steering lines 34 and 36 between steering unit 22 and the cylinders 24 and 26 to maintain fluid pressure in the cylinders in extreme conditions so that the steered wheels stay in phase. Since the valve 40 is added to the lines between the steering unit 22 and the cylinders, existing steering systems may be easily retrofitted for improved operation.

The valve 40 includes a pair of pilot operated variable orifices 44 and 46 connected in series with the respective lines 34 and 36. A pilot tube 44a connects the control input of the orifice 44 with the outlet port 36a. A similar pilot tube 46a connects the outlet port 34a with the control input of the orifice 46. Check valves 54 and 56 are connected in parallel with the orifices 44 and 46, respectively.

The check valve 54 or 56 assures relatively unrestricted pressurized fluid flow from the outlet port 34a or 36a to the associated steering cylinder, but return flow must bleed over the opposite orifice 46 or 44. The amount of restriction to return flow is determined by the pilot pressure which is dependent on the pressure in the pressurized output port 34a or 36a. The more pressure at the output port, the more open and unrestricted is the return line orifice 46 or 44. Therefore, the restriction automatically adjusts to changing steering control pressures to assure there is not an excess back pressure and that steering function remains good. However, the restriction of the orifice is always sufficient to assure that the return or drain lines from the cylinder 24 and 26 stay pressurized and the steering lines 34, 36 and 38 are pressurized. This pressure maintenance keeps the steering cylinders 24 and 26 in phase, even under severe load conditions. To prevent an over-pressure condition in the cylinders 24, 26 and the lines 34, 36, pilot lines 64 and 66 are connected from the output or load sides of the valve 40 to the respective variable orifices 44 and 46 to open the orifices and relieve the excess pressure.

In operation, when the operator desires to turn in the first direction, the steering wheel is rotated to pressurize the port 34a. Hydraulic fluid flows relatively freely through the check valve 54 to the line 34 and the base end of the cylinder 24 to extend the cylinder 24 and retract the cylinder 26. At the same time the pressure at the port 34a acts through the pilot line 46a to open the orifice 46 and reduce the restriction to return fluid flow from the base end of the cylinder 26 through the line 36. The amount of reduction of restriction is directly dependent on the fluid pressure being applied to base end of the cylinder 24. The check valve 56 assures that the return line fluid flow is through the orifice 46. The orifice restriction assures maintenance of system pressure to prevent steering phase loss.

When the steering wheel is turned the opposite direction, the port 36a is pressurized and fluid flows relatively freely through the check valve 56 to the base end of the cylinder 26 to steer the wheels the second direction. Fluid from the base end of the cylinder 24 returns to the steering control 22 through the orifice 44 having a restriction dependent on the pressure applied to the base end of the cylinder 26.

Having described the preferred embodiment, it will become apparent that various modifications can be made without departing from the scope of the invention as defined in the accompanying claims.

I claim:

1. In a hydraulic steering system for an off-road implement having at least first and second steerable wheels, first and second hydraulic steering cylinders connected to the respective steerable wheels, a steering unit for selectively supplying hydraulic fluid under variable pressure to the hydraulic cylinders for steering of the wheels, hydraulic lines connecting the cylinders for movement of the wheels in phase independently of a mechanical tie rod, wherein forces on the steerable wheels cause loss of pressure in the cylinders and movement of the wheels out of phase under certain steering conditions, the improvement comprising:

a valve assembly connected between the steering unit and the cylinders, the valve assembly including an input side connected to the steering unit, an output side connected to the hydraulic cylinders, the valve assembly including a variable orifice structure selectively restricting return flow of hydraulic fluid from the cylinders to the steering unit to maintain the hydraulic fluid from the cylinders under pressure.

2. The improvement as set forth in claim 1 above wherein the variable orifice structure includes a pilot operated orifice responsive to the variable pressure of the hydraulic fluid supplied from the steering unit, the pilot operated orifice having decreased flow resistance with an increase in the variable pressure.

3. The improvement as set forth in claim 1 wherein the variable orifice structure includes pilot structure connected to the cylinders and reducing the restriction of the return flow when the cylinder pressure reaches a preselected maximum pressure level thereby preventing an overpressure situation in the cylinders.

4. The improvement as set forth in claim 1 including a one-way valve connected in parallel with the variable orifice structure facilitating relatively unrestricted fluid flow towards the cylinders and directing fluid flow from the cylinders through the variable orifice.

5. In a hydraulic steering system for an off-road implement having at least first and second steerable wheels, first and second hydraulic steering cylinders connected to the respective steerable wheels, a steering unit for selectively supplying hydraulic fluid under variable steering pressure to the hydraulic cylinders for steering of the wheels, first and second hydraulic lines connecting the first and second cylinders for movement of the wheels in phase independently of a mechanical tie rod, wherein forces on the steerable wheels cause loss of pressure in the cylinders and movement of the wheels out of phase under certain steering conditions, the improvement comprising:

a valve assembly connected between the steering unit and the cylinders, the valve assembly including an input side with first and second input ports connected to the steering unit, an output side with first and second output ports connected to the hydraulic cylinders, the valve assembly including a variable orifice structure having first and second pilot operated orifices selectively restricting return flow of hydraulic fluid from the cylinders to the steering unit in dependence on the variable steering pressure from the steering unit to the cylinders to maintain the hydraulic fluid from the cylinders under pressure.

6. The improvement as set forth in claim 5 wherein the pilot operated orifices have decreased flow resistance with an increase in the variable pressure.

7. The improvement as set forth in claim 5 wherein the first pilot operated structure is connected in series with the first hydraulic line and includes a first pilot line connected to the second hydraulic line and the second pilot operated orifice is connected in series with the second hydraulic line and includes a second pilot line connected to the first hydraulic line.

8. The improvement as set forth in claim 7 including a one-way valve connected in parallel with the variable orifice structure facilitating relatively unrestricted fluid flow towards the cylinders and directing fluid flow from the cylinders through the variable orifice structure.

9. The improvement as set forth in claim 5 including a pilot line connecting the first hydraulic line to a control input of the variable orifice structure and controlling the variable orifice structure to reduce the restriction of the return flow when the cylinder pressure reaches a preselected maximum pressure level thereby preventing an overpressure situation in the cylinders.

10. In a hydraulic steering system for an off-road implement such as a self-propelled sprayer having at least first and second steerable wheels, first and second hydraulic steering cylinders connected to the respective steerable wheels, a cylinder-connecting line extending between the cylinders, a steering unit for selectively supplying hydraulic fluid under variable steering pressure to the first and second hydraulic cylinders through first and second hydraulic lines, respectively, for steering of the wheels, the first and second hydraulic lines and the cylinder-connecting line connecting the first and second cylinders for movement of the wheels in phase in first and second steered directions independently of a mechanical tie rod, wherein forces on the steerable wheels cause loss of pressure in one or more of the lines and a resulting movement of the wheels out of phase under certain steering conditions, the improvement comprising:

first and second pilot operated orifices connected to the first and second lines, respectively, and selectively restricting flow of hydraulic fluid between the cylinders and the steering unit in dependence on the variable steering pressure from the steering unit to the cylinders to maintain the hydraulic fluid in the lines under pressure, wherein the first pilot operated orifice includes a control input and a pilot line connecting the control input to the second hydraulic line, and the second pilot operated orifice includes a second control input connected to the first hydraulic line, whereby restriction to a return fluid flow of hydraulic fluid from one of the cylinders is dependent on the pressure applied to the other of the cylinders.

11. The improvement as set forth in claim 9 including first and second check valves connected in parallel with the first and second orifices, respectively, and providing generally free flow from the steering unit towards the cylinders through one of the check valves and compelling a return flow of hydraulic fluid from the cylinders to the steering unit to pass restricted through one of the orifices.

12. The improvement as set forth in claim 9 further including a pilot line structure connected to the cylinders and the pilot operated orifices, the orifices responsive to an overpressure situation in the cylinders to reduce restriction of the flow of fluid between the cylinders and the steering unit to relieve the overpressure situation.

* * * * *